United States Patent [19]

Tarquini

[11] Patent Number: 5,194,458
[45] Date of Patent: Mar. 16, 1993

[54] SURFACE MODIFIED FILLERS AND COMPOSITIONS CONTAINING THE SAME

[75] Inventor: Michael E. Tarquini, Havre de Grace, Md.

[73] Assignee: J. M. Huber Corporation, Rumson, N.J.

[21] Appl. No.: 727,294

[22] Filed: Jul. 9, 1991

Related U.S. Application Data

[63] Continuation of Ser. No. 611,553, Nov. 13, 1990, abandoned, which is a continuation of Ser. No. 191,763, May 3, 1988, abandoned, which is a continuation of Ser. No. 129,755, Dec. 4, 1987, abandoned, which is a continuation of Ser. No. 95,456, Sep. 11, 1987, Pat. No. 5,055,284, which is a continuation-in-part of Ser. No. 811,230, Dec. 20, 1988, abandoned.

[51] Int. Cl.$^5$ .............................................. C08K 9/06
[52] U.S. Cl. .................................... 523/212; 106/463; 428/403; 428/405; 523/200; 523/213; 524/424
[58] Field of Search ............... 428/403, 405; 523/200, 523/212, 213; 524/424; 106/463

[56] References Cited

U.S. PATENT DOCUMENTS

| | | | |
|---|---|---|---|
| 3,860,692 | 1/1975 | Nies et al. | 423/277 |
| 3,872,052 | 3/1975 | Fielding et al. | 106/288 B |
| 3,878,166 | 4/1975 | Woycheshin et al. | 260/45.9 R |
| 4,100,075 | 7/1978 | Ashman et al. | 252/8.1 |
| 4,144,081 | 3/1979 | van der Heem | 106/193 |
| 4,221,771 | 9/1980 | van der Heem | 423/419 P |
| 4,238,458 | 12/1980 | Misra | 423/419 P |
| 4,322,575 | 3/1982 | Skipper | 524/437 |
| 4,353,817 | 10/1982 | Nakae et al. | 524/399 |
| 4,353,997 | 10/1982 | Keogh | 523/210 |
| 4,394,469 | 7/1983 | Stratta | 523/212 |
| 4,576,819 | 3/1986 | Miyata et al. | 424/156 |
| 4,673,620 | 6/1987 | Shulman et al. | 428/500 |
| 4,743,644 | 5/1988 | Skipper et al. | 524/437 |

FOREIGN PATENT DOCUMENTS 5229838 3/1977 Japan .

OTHER PUBLICATIONS

Tarquini et al, "A Novel Flame Retardant Additive for Thermosets Requiring High End-Use Temperatures", presented at the 42nd Annual Conference and Expo, Composites Institute, The Society of the Plastics Industry, Inc., Feb. 2-6, 1987.

Tarquini et al, "A Novel Flame Retardant Additive for Polypropylene and Amorphous Nylon", presented at the SPE 45th Annual Technical Conference and Exhibit, May 4-7, 1987.

Tarquini et al, "Flame Retardant Thermosets Having Lower Smoke Generation", presented at the 43rd Annual Conference and Expo, Composites Institute, The Society of the Plastics Industry, Inc., Feb. 1-5, 1988.

"Silicones-Organosilicon Chemicals, Product Application Information", Apr. 1987.

"Silicones-Organofunctional Silanes-A Profile", May 1983.

Huber FRX-TRA: vol. 1, No. 1, May 1987; vol. 2, No. 1, Feb. 1988; and vol. 2, No. 2, Apr. 1988.

Primary Examiner—Paul R. Michl
Assistant Examiner—Edward Cain
Attorney, Agent, or Firm—Harold H. Flanders; Alec H. Horn; Robert L. Price

[57] ABSTRACT

A surface modified filler comprises sodium aluminocarbonate particles having a surface coating comprising an organofunctional silane or an organofunctional titanate. The surface modified filler is useful as a fire retardant material in thermoplastic and thermoset compositions.

2 Claims, No Drawings

SURFACE MODIFIED FILLERS AND COMPOSITIONS CONTAINING THE SAME

RELATED APPLICATIONS

This application is a continuation of application Ser. No. 07/611,553, filed Nov. 13, 1990 now abandoned, which was a continuation of application Ser. No. 07/191,763 filed May 3, 1988 now abandoned, which is a continuation in part application of copending U.S. aplication Ser. No. 129,755 filed Dec. 4, 1987 now abandoned which is a continuation of copending U.S. application Serial No. 095,456 filed Sep. 11, 1987 which is a continuation-in-part application of U.S. application Serial No. 811,230 filed Dec. 20, 1985, now abandoned.

FIELD OF THE INVENTION

The present invention relates to surface modified filler materials comprising surface modified sodium aluminocarbonate particles. The invention further relates to thermoplastic and thermoset compositions containing the surface modified filler materials as fire retardant additives.

BACKGROUND OF THE INVENTION

The increased use of polymers in various applications has increased the need for polymer compositions exhibiting reduced fire hazard characteristics. Recent governmental regulations have restricted the use of certain polymer materials in various areas so that the flame retardance and smoke toxicity of such materials must be considered in selecting polymers for use in particular applications.

A common method for reducing the flammability of a polymer composition comprises introducing elements into the polymer matrix which pyrolyze to form volatile gases which interfere with combustion of the polymer materials. Elements which have been introduced into polymer compositions include organo-halogens, for example, those that contain chlorine and bromine. Another method for improving the flame retardant characteristics of polymer compositions comprises adding high loadings of flame retardant filler materials such as alumina trihydrate, antimony oxide, magnesium hydroxide and the like. However, because alumina trihydrate exhibits a rather low degradation temperature, approximately 400° F., its use is precluded in many polymer applications which require high processing temperatures. Additionally, organo-halogens containing chlorine and bromine have been used in combination with filler materials such as antimony oxides and/or borates to provide additional fire retarding characteristics.

Additional materials have also been added to polymer compositions to improve their flame retardant characteristics. For example, the Stratta et al U.S. Pat. No. 4,394,469 and the Ashman et al U.S. Pat. No. 4,100,075 disclose surface treated antimony compounds which may be included in various organic resin and elastomer systems to improve flame-retardant properties. The Nies et al U.S. Pat. No. 3,860,692 discloses the use of crystalline sodium aluminum borate as a fire retardant for polyester compositions while the Woycheshin et al U.S. Pat. No. 3,878,166 and Japanese Patent No. 52-29838 disclose the use of dawsonite materials as flame retardant compounds in polymer compositions. The Fielding et al U.S. Pat. No. 3,872,052 also discloses polypropylene compositions including dawsonite materials. The Keogh U.S. Pat. No. 4,353,997 discloses silane modified alkylene-alkyl acrylate copolymers including both a mineral filler and a halogenated flame retardant additive.

As the use of polymer compositions in various applications increases, the need for such compositions exhibiting improved flame retardant characteristics continues.

SUMMARY OF THE INVENTION

Accordingly, it is an object of the invention to provide new filler materials which may be used as flame retardant additives in polymer compositions. It is an additional object of the present invention to provide filler materials which exhibit compatibility with various polymer compositions whereby the filler materials may be added to the polymer compositions without adversely effecting the physical properties of the polymer compositions. It is a related object of the invention to provide polymer compositions which exhibit flame retardant characteristics.

These and additional objects are provided by the surface modified fillers of the present invention. The surface modified fillers comprise sodium aluminocarbonate particles having a surface coating thereon. The surface coating comprises either an organofunctional silane or an organofunctional titanate compound. Preferably, the surface coating is included in an amount of from about 0.1 to about 10 weight percent, more preferably from about 0.5 to about 5 weight percent, based on the weight of the sodium aluminocarbonate particles. The surface modified fillers according to the present invention are useful as flame retardant additives in various polymer compositions including both thermoplastic and thermoset compositions. Particularly improved flame retardant properties have been exhibited in polymer compositions including at least about 50 weight percent of the surface modified fillers of the invention.

These and additional objects and advantages exhibited by the compositions of the present invention will be more fully understood in view of the following detailed description.

DETAILED DESCRIPTION

The surface modified fillers according to the present invention comprise sodium aluminocarbonate particles having a surface coating thereon. The sodium aluminocarbonate particles may be of a crystalline or an amorphous character, although substantially amorphous sodium aluminocarbonate particles containing not more than about 10 percent crystalline structure are preferred for use in the present invention. The sodium aluminocarbonate particles may be of the approximate formula $wNa_2O \cdot xAl_2O_3 \cdot yCO_2 \cdot zH_2O$, wherein w is from about 0.1 to about 5, x is from about 0.1 to about 5, y is from about 0.1 to about 7 and z is from about 0.1 to about 10, and may be formed according to any of the methods known in the art for forming sodium aluminocarbonate particles. A preferred method is set forth in the copending, commonly assigned application Ser. No. 129,755 filed Dec. 4, 1987 which is incorporated herein by reference and results in the formation of substantially amorphous sodium aluminocarbonate.

According to the method set forth in the aforementioned application, the sodium aluminocarbonate may be formed by continuously recycling an aqueous sodium carbonate solution from a reaction vessel through a recycle system and injecting a gas comprising carbon dioxide into the recirculating solution at a turbulent area located in the recycle system. Once the pH of the aqueous sodium carbonate solution reaches a desired value, an aqueous solution of sodium aluminate is then added to the reaction vessel. The resultant reaction mixture is allowed to digest and an amorphous aluminocarbonate product precipitates from the reaction mixture during the course of the reaction. After digesting, the precipitated product may be filtered, washed and dried in preparation for further treatment.

A metal hydroxide may optionally be mixed with the sodium aluminate aqueous solution during the preparation of the aluminocarbonate product in order to increase the stability of the sodium aluminate. The metal hydroxide is preferably an alkali metal hydroxide or an alkaline earth metal hydroxide or a mixture of an alkali metal hydroxide and an alkaline earth metal hydroxide. When a metal hydroxide is used, the resultant aluminocarbonate compound also includes the metal from the respective hydroxide. For example, if magnesium hydroxide or a mixture of sodium hydroxide and magnesium hydroxide are used to stabilize the sodium aluminate aqueous solution, the resultant product may comprise a product having the approximate formula $0.8MgO.1.1Na_2O.Al_2O_3.2CO_2.4.1H_2O$.

The size of the sodium aluminocarbonate particles used in preparing the surface modified filler of the present invention may vary over a wide range depending on the intended use of the filler material. Preferably, the average particle size of the sodium aluminocarbonate particles is in the range of about 0.1 to about 100 microns, as measured by the Coulter Counter technique, in order that the filler may be used to provide a polymer composition with homogeneous fire retardant characteristics. More preferably, the average particle size of the sodium aluminocarbonate particles is within the range of about 0.5 to about 50 microns.

Generally, sodium aluminocarbonate as synthesized has a hydrophilic surface which is not compatible with many polymer systems. As a result, a decrease in physical properties of a polymer may be observed at higher loadings of this material which are necessary to provide the polymer with acceptable fire retardant characteristics. Thus, according to the invention, the sodium aluminocarbonate particles are provided with a surface coating comprising an organofunctional silane or an organofunctional titanate compound. Organofunctional silanes and organofunctional titanates exhibit both an organic and an inorganic functionality which improves the compatibility between the inorganic sodium aluminocarbonate particles and an organic polymer composition. Thus, the fire retarding characteristics of the sodium aluminocarbonate particles may be provided to a polymer composition without adversely effecting other physical properties of the compositions to a significant degree. The surface coating compositions are therefore used in an amount which provides a compatibility between the sodium aluminocarbonate particles and the polymer compositions in which the particles are intended for use. Preferably, the surface coating is used in an amount of from about 0.1 to about 10 weight percent based on the weight of the particles. More preferably, the surface coating may be used in an amount of about 0.5 to about 5 weight percent, based on the weight of the particles, in order to provide compatibility between the particles and the polymer systems in which they are intended for use. It has also been discovered that the surface modified fillers of the invention exhibit improved flow characteristics, particularly as compared with non-surface modified sodium aluminocarbonate fillers.

Organofunctional silanes and organofunctional titanates are well known in the art and are commercially available. The organofunctional compounds which are included in the surface coating compositions should include a reactive organic functional group which matches the functionality of the polymer composition in which it is intended for use. Additionally, the organofunctional compounds should include at least one readily hydrolyzable group. Suitable organofunctional silanes for use in the surface coatings of the invention may be represented by the formula

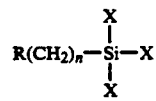

wherein each X is halogen or a hydrolyzable organic group, R is a reactive group and n is an integer of from 1 to about 30. In preferred organofunctional silanes for use in the surface modified fillers, X is selected from the group consisting of halogens, $-OR_1$ and $-OR_1OR_2$, wherein $R_1$ and $R_2$ are each an alkyl group having from 1 to 5 carbon atoms. Additionally, R is preferably a reactive group selected from the group consisting of vinyl, amino, epoxy, mercapto, urea and methacryloxy groups. Preferably, n is an integer of from 1 to 10. Alternatively, if R is a vinyl group, n may be 0. These organofunctional silanes and similar organofunctional titanates are, as set forth above, well known and commercially available.

As set forth above, the surface modified filler materials according to the present invention are particularly useful in polymer compositions for providing the polymer compositions with fire retardant characteristics. The surface modified fillers may be included in either thermoplastic compositions or thermoset compositions as desired. The amount of a surface modified filler included in the polymer compositions will vary depending on the end use of the polymer. Preferably, the surface modified fillers are included in an amount of at least 10 weight percent, for example, from about 10 to about 70 weight percent, of the compositions. Polymer compositions exhibiting particularly improved flame retardant properties have been provided when the surface modified filler materials according to the present invention are included in amounts of at least about 50 weight percent. Preferred polymer compositions exhibiting fire retardant properties include the surface modified filler materials in amounts ranging from about 50 to about 60 weight percent.

The surface modified fillers may be used in combination with various thermoplastic polymers for use in numerous applications. Suitable thermoplastic polymers include, but are not limited to, polyolefins, polyamides, polyacrylates, polyvinylchlorides, polystyrenes, elastomers and mixtures thereof. As will be set forth in the following examples, the surface modified filler materials of the invention may advantageously be combined with a polyolefin such as polyethylene, polypropylene, polybutylene or mixtures thereof to provide polymer compositions exhibiting improved fire retardant properties. The surface modified filler materials may be combined with either crystalline polyamide polymers, for example, the well known nylon polymers, or amorphous polyamide polymers to provide compositions exhibiting fire retardant characteristics. Additional thermoplastic polymers well known in the art may be used in combination with the surface modified fillers in a similar manner. However, the use of the surface modified filler materials of the present invention as fire retardant additives in thermoplastic polymers reduces the adverse effect on, and in some cases even improves, the mechanical properties of the thermoplastic polymers to a significant degree.

Similarly, the surface modified filler materials of the invention are useful as flame retardant additives in thermoset resin compositions. Suitable thermosetting resins for use in combination with the surface modified fillers include, but are not limited to, polyesters, epoxides, alkyl resins, phenolic resins and the like, and mixtures thereof. The surface modified filler materials of the invention provide the thermosetting resins with fire retardant characteristics without adversely effecting other properties of the compositions, for example, cure properties and viscosity. In fact, in some instances, the surface treated sodium aluminocarbonate filler materials of the invention have provided polymer systems exhibiting improved cure properties and reduced viscosities.

The surface coating may be applied to the sodium aluminocarbonate particles by any coating techniques known in the art, for example, by direct combination with the particles in a high intensity mixer. It has been discovered that if the sodium aluminocarbonate is thoroughly dried it will more readily accept the surface coating. It is also believed that any fluidizing equipment known in the art may be suitable for applying the surface coating to the sodium aluminocarbonate particles. The surface modified filler may be compounded with the polymer compositions in a conventional manner.

The following examples are provided to demonstrate the surface modified filler materials of the invention and the polymer compositions containing such filler materials.

EXAMPLE 1

Surface modified filler materials were prepared according to the present invention as follows. Amorphous sodium aluminocarbonate particles A having an average particle size of about 9 microns as measured by the Coulter Counter technique were mixed with approximately 1 weight percent of an organofunctional silane comprising a vinyl silane. Additional sodium aluminocarbonate particles B having a similar average particle size were mixed with approximately 1 weight percent of an organofunctional silane comprising a methacryloxyalkyl silane. An additional portion of nonmodified sodium aluminocarbonate particles C were reserved for producing comparative compositions. The surface coating was provided by mixing the components in a high intensity mixer. The physical properties of the resulting surface modified fillers were measured and compared with the properties of the nonmodified sodium aluminocarbonate particles. The BET surface area was determined with a Monosorb instrument using a sample that had been outgassed at 130° C. The oil absorption was determined using the spatula rub out method according to ASTM D-281. The results are set forth in Table I.

TABLE I

| Property | Filler A | Filler B | Filler C |
|---|---|---|---|
| BET Surface area, m²/g | 15 | 15 | 19 |
| Oil absorption, cc/100 g | 26 | 27 | 33 |
| Pour density, lbs/ft³ | 42.18 | 42.18 | 40.02 |
| Pack density, lbs/ft³ | 78.04 | 80.04 | 62.43 |
| Gardner brightness | 93.1 | 94.0 | 96.8 |

As indicated in Table I, the surface coating does not significantly effect the measured properties of the sodium aluminocarbonate particles.

EXAMPLE 2

In this example, thermoset compositions 2A, 2B and 2C were prepared using the surface modified particles A and B and the nonmodified particles C from Example 1, respectively. A thermosetting polymer comprising a methacrylate-based polyester resin (45 percent solids) was included in the compositions. A Cowles-type high intensity mixer equipped with a high sheer mixing blade was used to prepare each composition. An initial two minute mixing time prior to filler addition was used to dissolve a benzoyl peroxide curing catalyst (2 phr, 50% solution) into the resin. Once the catalyst had dissolved, the filler was added to the resin over a period of about 1 minute. Once the entire amount of filler was added, the mixture was mixed for an additional two minutes. A dimethylparatoluidine promoter (0.2 phr) was then added, followed by hand mixing for 30 seconds. All samples were deaerated under vacuum prior to use. A water-cooled, jacketed water bath was used in order to minimize temperature fluctuations during mixing. Compositions containing 40 weight percent filler, 50 weight percent filler, and 60 weight percent filler were prepared using each of the fillers A, B and C from Example 1. The viscosities of the resultant compositions were determined using a Brookfield RVT viscometer, 20 rpm, 25° C., the results of which are set forth in Table II.

TABLE II

| Viscosity, cps | Filled Thermoset Composition | | |
|---|---|---|---|
| | 2A | 2B | 2C |
| 40% filler | 60 | 55 | 60 |
| 50% filler | 105 | 108 | 288 |
| 60% filler | 520 | 360 | 670 |

The viscosity of an unfilled thermoset composition was measured at 20 cps. The compositions containing 40 weight percent filler exhibited similar viscosities. However, the compositions containing 50 and 60 weight percent of the surface coated filler exhibited significantly lower viscosities as compared with the compositions containing 50 and 60 weight percent of nonmodified filler.

The compositions prepared using 50 weight percent filler and the unfilled thermoset composition were also subjected to measurement of the tensile properties, the results of which are set forth in Table III.

TABLE III

| Property | Tensile Properties - 50% Loading | | | |
|---|---|---|---|---|
| | 2A | 2B | 2C | Unfilled |
| Modulus, psi | 634,600 | 656,300 | 723,000 | 606,800 |
| Strength, psi | 8,683 | 9,353 | 8,584 | 13,460 |
| Total elongation, % | 1.66 | 1.69 | 1.50 | 2.92 |

The results set forth in Table III indicate that the compositions containing the surface modified filler materials exhibited improved tensile properties as compared with the composition containing the nonmodified filler.

EXAMPLE 3

In this example, the thermoset compositions prepared in Example 2 containing 40 weight percent filler and 50 weight percent filler were subjected to various tests for evaluating the fire retardant properties of the compositions. Specifically, the compositions were subjected to the Underwriters Laboratories UL 94 vertical burn test as described in the UL 94 bulletin entitled "Tests for Flammability of Plastic Materials for Parts in Devices and Appliances". The compositions were also subjected to the limiting oxygen index test which was performed as described in the instructural manual for United States Testing Laboratories Limiting Oxygen Test Apparatus, Model 8100. Smoke obscuration data was also collected on the compositions using a super pressure smoke density chamber developed at the National Bureau of Standards. The samples were evaluated in both the flaming and non-flaming mode in accordance with ASTM E-662. Carbon dioxide and carbon monoxide levels were evaluated on smoke samples at the maximum specific optical density, $D_m$, by diverting a gas stream to a Hach-Carle Series 400 AGC gas chromatograph. The results of these tests are set forth in Table IV.

TABLE IV

| | Thermosetting Composition - % Filler | | | | | | |
|---|---|---|---|---|---|---|---|
| | 2A | | 2B | | 2C | | |
| Property | 40% | 50% | 40% | 50% | 40% | 50% | Unfilled |
| Vertical burn, UL 94 | failed | *V-O | failed | *V-O | failed | *V-O | failed |
| LOI | 27.5 | 29.5 | 26.5 | 28.5 | 26.5 | 29.5 | 18.5 |
| Smoke Chamber-Flaming Mode: | | | | | | | |
| $D_m$ | 92 | 68 | 71 | 90 | 68 | 94 | 518 |
| Time to $D_m$ | 15.0 | 15.0 | 13.5 | 15.5 | 12.5 | 15.5 | 5.5 |
| Time to D = 16 | 8.8 | 8.0 | 4.5 | 8.5 | 5.2 | 8.2 | 1.0 |
| $CO_2$, ppm | 25662 | 26514 | 30758 | 31521 | 25604 | 29242 | 31128 |
| CO, ppm | 824 | 789 | 856 | 1054 | 725 | 1188 | 376 |
| Smoke Chamber-Non-Flaming Mode: | | | | | | | |
| $D_m$ | 259 | 250 | 262 | 220 | 271 | 256 | 329 |
| Time to $D_m$ | 22.0 | 17.0 | 18.2 | 20.5 | 14.5 | 17.5 | 21.5 |
| Time to D = 16 | 3.8 | 3.8 | 4.0 | 4.5 | 3.5 | 4.2 | 3.0 |
| $CO_2$, ppm | 4816 | 6340 | 4328 | 6064 | 3766 | 7144 | 1632 |
| CO, ppm | 290 | 459 | 228 | 334 | 208 | 595 | 284 |

*V-O: pass rating

The results set forth in Table IV demonstrate that thermoset compositions containing greater than about 50 weight percent of the surface modified filler are advantageous in that they pass the UL 94 vertical burn test.

EXAMPLE 4

A thermoplastic composition was prepared comprising polypropylene and a surface modified filler according to the present invention. More particularly, the surface modified filler D comprised amorphous sodium aluminocarbonate having an average particle size of approximately 1 micron which was surface coated with a commercially available mixture of organofunctional silane compounds in an amount of about 1 weight percent, based on the weight of the sodium aluminocarbonate particles. The surface modified filler exhibited a surface area of 13 m²/g, an oil absorption of 38 cc/100 g, a pour density of 0.40 g/cc, a pack density of 0.79 g/cc and a Gardner brightness of 95.1. The polypropylene was supplied by Northern Petrochemicals under the designation 8752 HF. The filled thermoplastic compositions were prepared by mixing the polypropylene and the surface modified filler in a Farrel Model B Banbury mixer. The rough samples were chipped and double-passed through a Davis standard 1.5 inch single screw extruder. The extruded strands were pelletized and molded on a Newberry 50 ton injection molder.

Compositions were prepared with varying filler loadings. Table V sets forth the tensile properties of compositions prepared containing 38 weight percent, 55 weight percent and 60 weight percent of the surface modified filler D. Table V also sets forth similar properties of compositions containing nonmodified sodium aluminocarbonate particles and of compositions containing no filler. The compositions were also subjected to the UL 94 vertical burn test described in the previous examples. The unfilled thermoplastic composition easily failed the vertical burn test. The compositions containing 55 weight percent and 60 weight percent filler loadings all passed although the composition containing 38 weight percent filler failed the vertical burn test.

TABLE V

| Thermoplastic Compositions | | | | | |
|---|---|---|---|---|---|
| | Modulus, psi | Tensile (Y), psi | Elongation (Y), % | Tensile (B), psi | Elongation (B), % |
| Filler D | | | | | |
| 38 wt % | 153,616 | 2302 | 3.6 | 1730 | 14.7 |
| 55 wt % | 289,258 | 2286 | 0.96 | 2286 | 0.96 |
| 60 wt % | 335,290 | 2388 | 1.0 | 2388 | 1.0 |
| Nonmodified Filler | | | | | |
| 38 wt % | 171,599 | 2222 | 2.8 | 1651 | 22.7 |
| 55 wt % | 263,726 | 2086 | 1.2 | 2086 | 1.2 |
| 60 wt % | 309,774 | 2460 | 1.1 | 2460 | 1.1 |
| Unfilled | 110,091 | 2873 | 8.4 | — | — |

EXAMPLE 5

Thermoplastic compositions were prepared comprising an amorphous nylon polymer supplied by Atochem under the designation Pebax 6333 and the surface modified filler D described in Example 4. The compositions were mixed in a Baker-Perkins 50 mm twin screw extruder. The strands were pelletized and molded on a Newberry 50 ton injection molder. The composition contained 40 weight percent of the surface modified filler. Both the filled composition and an unfilled nylon composition were subjected to the UL 94 vertical burn test. While the unfilled composition easily failed the test, the filled composition passed with a UL 94 V-O rating. The physical properties of the filled and unfilled compositions are set forth in Table VI.

TABLE VI

| Property | Thermoplastic Composition | |
| --- | --- | --- |
|  | Filler D | Unfilled |
| Modulus, psi | 80,860 | 31,130 |
| Tensile (Y), psi | 3,615 | 4,997 |
| Elongation (Y), % | 17.93 | >351.7 |
| Tensile (B), psi | 3,403 | — |
| Elongation (B), % | 27.09 | — |
| Flexural Modulus, psi | 110,800 | 47,160 |
| Flexural Strength, psi | 3,706 | 1,933 |

The properties set forth in Table VI indicate that the surface modified filler also improved the modulus and flexural properties of the thermoplastic compositions.

The preceding examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A surface modified filler, comprising sodium magnesium aluminocarbonate particles having a surface coating theron, said sodium magnesium aluminocarbonate particles being substantially amorphous and said surface coating comprising an organofunctional silane or an organofunctional titanate said filler giving an UL 94 O.V. rating at 50% loading for thermosetting resins and an UL 94 O.V. rating at 55% for thermoplastic resins.

2. A surface modified filer as defined by claim 1, wherein the sodium aluminocarbonate has the approximate formula $0.8MgO.1.1Na_2O.Al_2O_3.2CO_2.4.1H_2O$.

* * * * *